United States Patent
Colloton

[11] 3,727,712
[45] Apr. 17, 1973

[54] COOLING ARRANGEMENT
[75] Inventor: Marcus J. Colloton, Cedarburg, Wis.
[73] Assignee: Simplicity Manufacturing Company, Inc., Port Washington, Wis.
[22] Filed: Nov. 11, 1971
[21] Appl. No.: 197,693

[52] U.S. Cl..........180/66 R, 123/41.31, 123/41.33, 165/51, 165/76, 180/68 R
[51] Int. Cl......................B60k 11/06, B60k 19/14
[58] Field of Search.................165/51, 76; 123/41.31, 41.33, 41.56; 180/66 R, 68 R

[56] References Cited

UNITED STATES PATENTS

| | | | |
|---|---|---|---|
| 2,474,518 | 6/1949 | Davies | 123/41.33 X |
| 2,789,647 | 4/1957 | Couse | 165/51 X |
| 3,334,704 | 8/1967 | Gehrke et al. | 180/68 R |
| 3,404,732 | 10/1968 | Mork | 123/41.33 X |
| 3,630,003 | 12/1971 | Ashton et al. | 180/68 R X |

Primary Examiner—Albert W. Davis, Jr.
Attorney—Kenneth C. McKivett et al.

[57] ABSTRACT

This invention is concerned with a cooling system for a tractor having an air-cooled engine and having a hydraulic fluid transmission. This system includes having a hydraulic fluid radiator through which cooling air is drawn before passing same over the engine for cooling same and wherein such radiator can be pivoted about the longitudinal axis of such tractor to provide ready access to mechanism underlying such radiator and also presenting such radiator to a position where it can be readily cleaned.

4 Claims, 5 Drawing Figures

PATENTED APR 17 1973 3,727,712
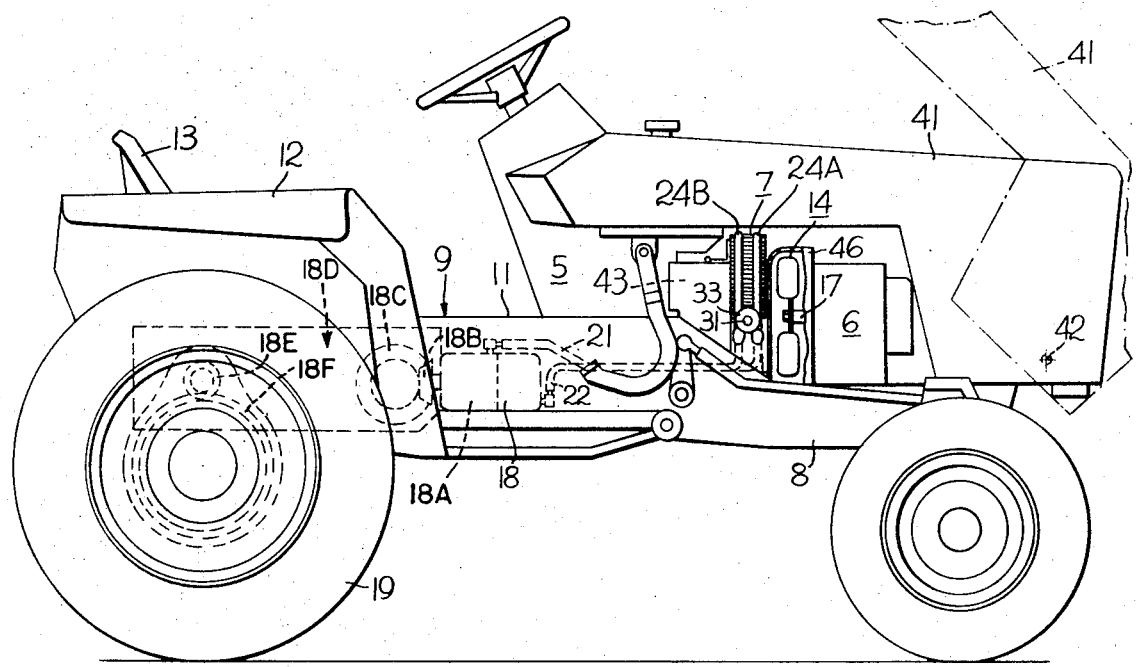
Fig.-1
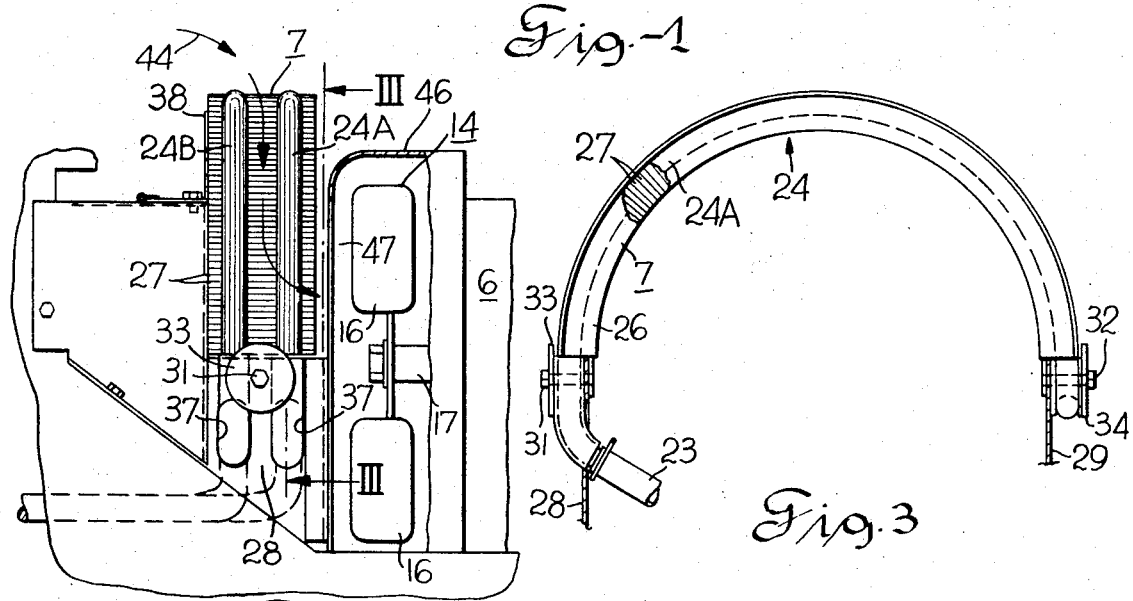
Fig.2
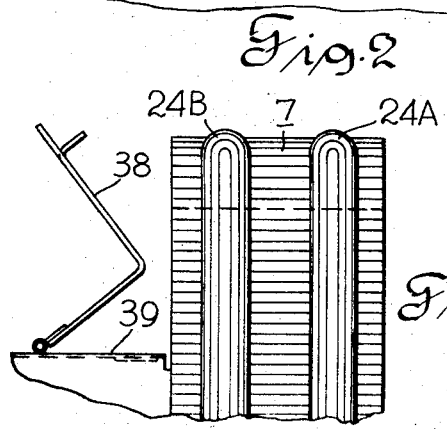
Fig.4
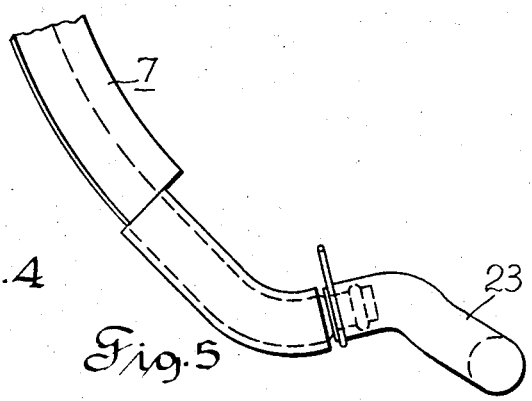
Fig.3
Fig.5

COOLING ARRANGEMENT

This invention relates generally to engine cooling systems and more particularly to an improved arrangement for supplying engine cooling air to an engine after such air has cooled hydraulic fluid.

A feature of this invention is the using of engine cooling air to also cool the transmission hydraulic fluid.

A further object of this invention is the positioning of a fan between a front mounted air-cooled engine and a radiator for cooling transmission hydraulic fluid.

A further object of this invention is to provide a cooling radiator for transmission hydraulic fluid which can be pivoted to a handy position for servicing mechanism underlying such radiator when in normal position.

A further object of this invention is to provide a cooling radiator for transmission hydraulic fluid which can be pivoted to a handy position for cleaning out the fin passages of such radiator.

Referring now to the drawings:

FIG. 1 is a side elevation of a tractor embodying the invention, some portions of the tractor have been removed to better illustrate the invention;

FIG. 2 is an enlarged portion of the tractor as shown in FIG. 1;

FIG. 3 is a section view taken on line III—III of FIG. 2;

FIG. 4 is an enlarged view of a portion of FIG. 2 showing a pivoted support for a radiator; and FIG. 5 is an enlarged view of a portion of FIG. 3 showing a radiator in a pivoted position.

Referring now to the drawing a tractor 5 has an air-cooled internal combustion engine 6. Transmission fluid is circulated through a radiator 7 mounted on longitudinally extending main frame 8 at a midportion thereof to the rear of engine 6. Engine 6 is mounted on main frame 8 at a forward portion thereof by conventional means. A the rear end of frame 8, an operator's platform or station 9 is provided. This station includes a floor portion 11 attached to frame 8, transversely spaced side members 12 carried by frame 8 and adapted to support operator's seat 13. Positioned forward of radiator 7 is a suction fan 14 including blades 16 attached to the rearward end of shaft 17. Shaft 17 is operatively connected to engine 6 (by conventional means not shown) to be driven thereby.

A hydraulic pump 18 is carried on a midportion of frame 8 and is driven by engine 6 through conventional means not shown. Pump 18 provides pressure fluid for driving a fluid motor 18A. Bevel gear 18B is attached to motor 18A to be driven thereby and bevel gear 18B in turn drives bevel gear 18C, the power input gear of a conventional three speed transmission 18D shown diagrammatically as a box in FIG. 1 and having a power output gear 18E drivingly connected to gear 18F which is attached to tractor wheels 19 for driving same. Hydraulic pump 18 and motor 18A is provided with means for cooling the hydraulic transmission fluid being circulated thereby and this means includes conduits 21 and 22 connected to motor 18A and pump 18, respectively, and connected to radiator 7 by means of rubber connectors 23 only one of which is shown.

Radiator 7 is provided with a double U-shaped conduit 24. As shown in FIG. 3, one end of conduit 24 is connected to rubber connector 23 from whence one leg 24a extends in a semicircular path to a position diametrically opposed from such starting point at which point conduit 24 is bent in a U-shaped configuration and then the second leg 24b of conduit 24 then parallels the first leg of conduit 24 returning to a point of connection with a rubber connector 23. Conduit 24 is provided with a series of heat dissipating fins 26 which are positioned on conduit 24 to provide radially extending air passages 27 between adjacent fins.

Radiator 7 is attached to frame members 28 and 29 by bolts 31 and 32 and retaining members 33 and 34 respectively with bolts 31 and 32 being threadably engaged with members 28 and 29 carried by frame 8. Member 28 is provided with openings 36 and 37 through which conduits 21 and 22 pass through. An additional support for radiator 7 is bracket 38 which is pivotally supported on cover 39 attached to frame 8.

Tractor 5 is provided with a pivotally mounted hood 41 which is provided with a front grill (not shown). Hood 41 can be pivoted about transverse axis 42 when it is desired to service the engine 6 or other tractor components.

Underlying radiator 7 is a clutch mechanism 43 for engine 6 and to gain access to such clutch for servicing, or adjustment, radiator 7 can be pivoted out of the way. This is accomplished by first raising hood 41, then bolts 31 and 32 and retainers 33 and 34 are removed, radiator 7 can now be pivoted about rubber connectors 23 (FIG. 5) in a transverse direction to provide access to the clutch mechanism 43. By pivoting the radiator to the position shown in FIG. 3 the radiator 7 also presents itself for handy cleaning out of the air passages 27 which might be partially clogged.

FIG. 2 shows how cooling air is circulated in the tractor to not only cool the transmission hydraulic fluid but also to cool engine 6. The arrow 44 in FIG. 2 shows the path of this air. Fan 14 sucks air through radial passages 27 and thereby cooling the hydraulic transmission fluid and then such air is blown longitudinally over engine 6 and out through the forward end of the hood 41 or the sides of tractor 5 forward of engine 6.

It is to be noted that fan 14 is provided with a surrounding cowling 46 provided with an opening 47 providing an air intake opening positioned longitudinally adjacent and radially positioned inwardly from radiator 7 so that fan 14 sucks air through radiator 7 to provide cooling of the transmission hydraulic fluid passing through radiator 7. After passing through passages 27 the cooling air is then blown over engine 6 to cool same.

The embodiments of the invention in which an exclusive property or privilege is claimed are defined as follows:

1. In combination, a hydraulically driven tractor having a longitudinally extending main frame, an air-cooled engine mounted on the forward end of said frame, a semicircular radiator carried by said frame and having radially extending air passages to provide cooling for said radiator, a fluid pump carried by said frame for moving hydraulic fluid through said radiator, a hydraulic motor operatively connected to said tractor for driving same, said hydraulic motor being drivenly connected to said pump so that said motor is driven by said hydraulic fluid, said pump being driven by said air-cooled engine, a fan driven by said engine and being positioned longitudinally between said radiator and said engine, a cowling carried by said frame and positioned about said fan for directing air passing radially through said radiator to said fan entrance and longitudinally forwardly over said engine to a point of discharge at the forward end of said tractor.

2. In the combination recited in claim 1 and wherein said semicircular radiator is pivotally mounted on said frame so that said radiator may be pivoted outwardly about one end portion thereof to provide access to mechanism underlying said radiator and to said radiator.

3. In the combination recited in claim 2 and wherein said radiator is provided with said pivotal mounting being provided by means of a rubber hose.

4. In the combination recited in claim 3 and wherein said radiator comprises a fluid conduit starting at one end thereof and continuing to the other end and returning to the first end, a plurality of fins attached to said conduit for dissipating heat.

* * * * *